Aug. 20, 1968 E. V. ABAROTIN 3,397,656
MECHANISM FOR AUTOMATICALLY CONTROLLABLY MOVING THE SPECIMEN
MOUNTING STAGE OF A MICROSCOPE
Filed May 10, 1965 2 Sheets-Sheet 1

INVENTOR
Eugene V. Abarotin

Aug. 20, 1968  E. V. ABAROTIN  3,397,656
MECHANISM FOR AUTOMATICALLY CONTROLLABLY MOVING THE SPECIMEN
MOUNTING STAGE OF A MICROSCOPE
Filed May 10, 1965  2 Sheets-Sheet 2
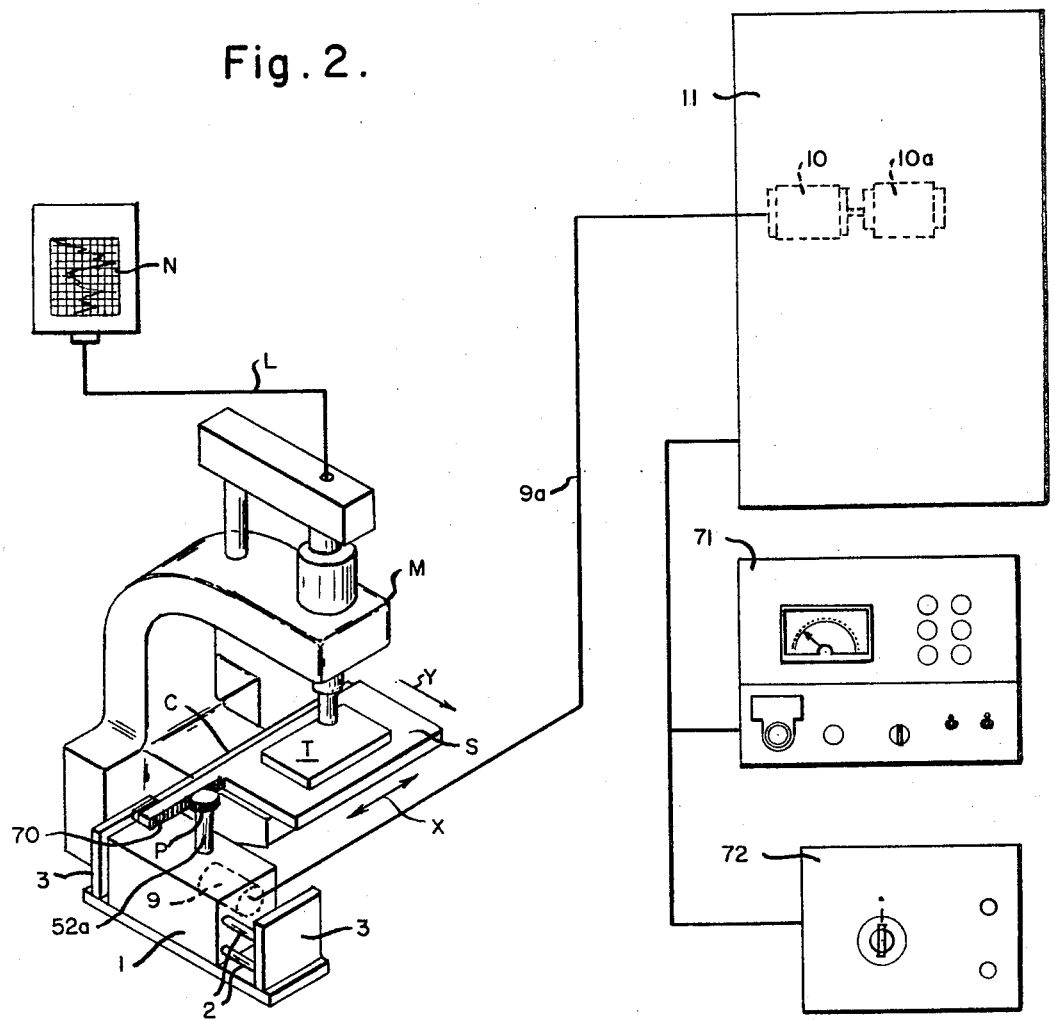
Fig. 2.
Fig. 3.
INVENTOR
Eugene V. Abarotin
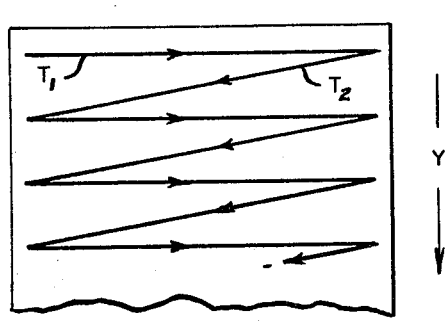

United States Patent Office 3,397,656
Patented Aug. 20, 1968

3,397,656
MECHANISM FOR AUTOMATICALLY CONTROLLABLY MOVING THE SPECIMEN MOUNTING STAGE OF A MICROSCOPE
Eugene V. Abarotin, 3538 McWilliams Road, Murrysville, Pa. 15668
Filed May 10, 1965, Ser. No. 454,298
12 Claims. (Cl. 108—20)

ABSTRACT OF THE DISCLOSURE

Mechanism for automatically controllably moving the specimen mounting stage of a microscope comprising means connected with the stage acting on the stage to reciprocate it back and forth and simultaneously with and preferably throughout such reciprocatory movement in one direction moving the stage transversely of the direction of back and forth reciprocation whereby the optical train of the microscope covers a predetermined field on the stage in automatically controlled manner. The mechanism preferably includes a housing together with means carried by the housing for reciprocating the stage back and forth and means for moving the housing transversely of the direction of back and forth reciprocation of the stage to correspondingly move the stage. The means carried by the housing for reciprocating the stage back and forth may be a rotatable member mounted in the housing to turn about an axis which is fixed relatively to the housing and connected with the stage to move the stage in its reciprocating back and forth movement upon turning of the rotatable member, the stage being further connected with the rotatable member so that the stage is moved transversely of the direction of the reciprocating back and forth movement upon movement of the housing.

---

The present invention relates to mechanism for automatically controllably moving the specimen mounting stage of a microscope. More particularly, it relates to mechanism to be used in conjunction with a light sensitive cell at the viewing end of the microscope, which mechanism causes the specimen to pass before the cell in a succession of predetermined routes.

A related object of the invention is to provide means for precise movement of the microscope stage and for accurate measurement of that movement.

Petrographic examination of polished sections may be used to determine rock properties, including quantitative mineral composition, structural characteristics, crystal size, etc. Such examination, if done manually, is often so time-consuming as to be impractical; therefore, an automatic system for making petrographic examination has been developed.

In an automatic microscope system a motorized mechanical microscope stage moves the polished specimen at a constant speed, the optical train of the microscope limits the area under examination at any instant and a photomultiplier tube system transduces a measureable signal from the light reflected from the area under examination. Because the intensity of the reflected light is characteristic of a mineral being examined and the traverse speed of the specimen is constant, the electrical output of the photomultiplier tube is determined by the minerals present and by the crystal size of those minerals. The level of the signal identifies each mineral as it is encountered; the duration of the signal at a given level is related to the size of the crystal. These data can either be recorded on chart paper which is subsequently analyzed or fed to an apparatus for analyzing the photomultiplier tube signal to obtain the quantitative mineral composition and crystal-size measurement directly.

The use of my mechanism for automatically controllably moving the specimen mounting stage facilitates the determination of the composition and structure of carbon, coal, coke, ore and other specimens. In addition, the non-metallic inclusions (type and content) found in different steels, and pore-size distributions of various refractory materials, etc., can be determined. The movement of the specimen mounting stage should be smooth and continuous and capable of exact measurement.

Present methods of mechanically moving the specimen mounting stage are cumbersome and complex and require specially constructed microscopes. Moreover, the motor means imparting the movement are either incapable of operation at desired uniformly constant speed or else are large and cumbersome and hence inefficient.

I have solved the long-existing problem by providing a compact mechanism imparting to the specimen mounting stage simultaneous movement in two directions at ninety degrees to each other (a diagonal pass) which can be applied to any standard microscope, together with motor means uniquely adapted to driving the mechanism. I further provide means for changing the speed of movement in one direction, thus changing the angle of the diagonal pass.

I provide a stationary base with a housing movable reciprocably on guide rods carried by the stationary base. I may move the housing by means of a lead screw journaled in the housing and turning in a threaded opening in the stationary base. A synchro-receiver may be provided which is carried by the housing in operable association with a commercial servo-system having a synchrotransmitter outside the housing. I prefer to provide a worm gear in drive connection with the synchro-receiver and a fixed gear reducer in drive connection with the worm gear. A multi-step gear reducer may be disposed in gear train connection with the fixed gear reducer. Desirably a one-way clutch is in drive connection with the input gear of the multi-step gear reducer. The output shaft of the multi-step gear reducer may have gear means engaging the gear means of the one-way clutch.

A vertical shaft may be provided which is preferably positioned with its lower extremity in drive relationship with the fixed gear reducer and its upper extremity in connection with the spur gear for effecting lateral movement of the microscope stage. I preferably adjustably space from each other two limit switches in a line parallel to the lateral movement of the microscope stage. A limit switch actuator may be mounted for movement between the limit switches. There may be provided a second vertical shaft with its lower extremity in drive relationship with the fixed gear reducer and its upper extremity in drive relationship with the limit switch actuator, the gearing being such that the vertical shafts have a fixed drive ratio so that lateral movement of the microscope stage is proportioned to movement of the limit switch actuator. The limit switches are preferably connected to the commercial servo-system which reverses whenever one of the switches is touched by the limit switch actuator.

Other details, objects and advantages of the invention will become apparent as the following description of a present preferred embodiment thereof proceeds.

In the accompanying drawings I have shown a present preferred embodiment of the invention in which FIGURE 1 is a diagrammatic isometric view with portions cut away of my mechanism for automatically controllably moving the specimen mounting stage of a microscope;

FIGURE 2 is a schematic diagram illustrating the servo-system employed; and

FIGURE 3 is a diagram illustrating the pattern of movement of a point on a specimen fixed to the mounting stage of the microscope.

Figure 1:
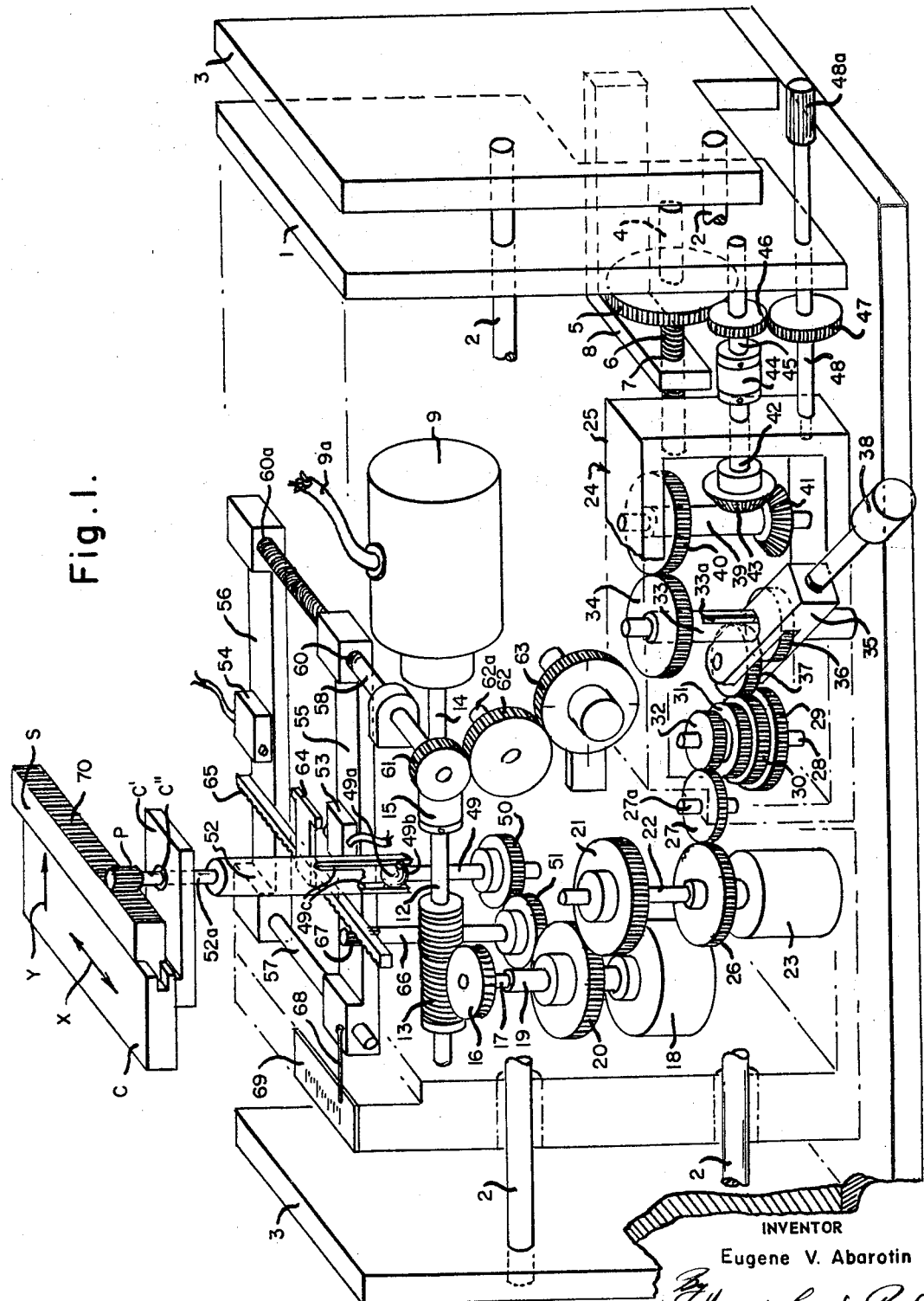

Referring now more particularly to the drawings, the microscope is designated generally by the letter M and may be conventional except for the mechanism for automatically controllably moving the specimen mounting stage thereof. The specimen mounting stage is designated S and is shown in FIGURE 2 as having a specimen T mounted thereon in line with the optical train of the microscope. The microscope may contain a light sensitive cell (not shown) with electric circuitry indicated generally at L for making a record on a chart N as well known to those skilled in the art. The specimen mounting stage S is carried by a carrier C, a slidable interfitting connection between the stage S and the carrier C being shown in FIGURE 1 whereby the stage may be moved reciprocably relatively to the carrier C in the direction of the double headed arrow X. As will presently be described the carrier and stage are also adapted to be moved in the direction of the arrow Y simultaneously with movement of the stage relatively to the carrier in the direction of the double headed arrow X. The directions indicated by the respective arrows X and Y are transverse to each other and in the embodiment shown are at substantially right angles or 90° to each other.

FIGURE 1 shows a housing 1 slidably carried on guide rods 2 mounted in a stationary base 3. A shaft 4 having a threaded portion 6 is mounted for rotation in the housing 1, the threaded portion 6 of the shaft 4 being in threaded engagement with an internally threaded opening 7 in a bracket 8 forming part of the stationary base 3. Also a spur gear 5 is fixed to the shaft 4.

A synchro-receiver 9 such as a selsyn is mounted within the housing 1 and is connected by circuitry designated generally by 9a to a synchro-transmitter 10 such as a selsyn (FIGURE 2) forming a part of a conventional servo-system 11 which is well known to those skilled in the art, wherefore it is not shown and described in detail. A reversing motor 10a is coupled in conventional manner to the synchro-transmitter 10 to drive the synchro-transmitter. The synchro-receiver 9 constitutes motor means mounted in the housing 1 for operating the mechanism for automatically controllably moving the specimen mounting stage S of the microscope M.

The shaft 14 of the synchro-receiver 9 is coupled at 15 with a shaft 12 journaled in the housing 1, and a worm 13 is fixed to the shaft 12. A worm wheel 16 meshes with the worm 13, the worm wheel 16 being fixed to a vertical shaft 17 which enters a fixed gear reducer 18 and is the input shaft of the gear reducer. The output shaft of the gear reducer 18 is a hollow shaft 19 disposed about the shaft 17 and which rotates counter to the direction of rotation of the shaft 17. A spur gear 20 is fixed to the shaft 19. A spur gear 21 meshes with the spur gear 20, the spur gear 21 being fixed to a shaft 22 which is the shaft of a one-way clutch 23 having an output spur gear 26.

Mounted within the housing 1 is a mounting structure 25 carrying a multi-speed gear reducer designated generally by reference numeral 24. The input gear for the multi-speed gear reducer is the spur gear 27 carried by a stub shaft 27a which meshes with the spur gear 26 and also with a spur gear 32 fixed to a vertical shaft 28. Also fixed to the shaft 28 are spur gears 31, 30 and 29 of successively increasing diameter as shown in FIGURE 1.

Rotatably mounted in the mounting structure 25 is a vertical shaft 33 having a spur gear 34 fixed thereto at its upper extremity. A fork 35 has a bore receiving the shaft 33, which shaft has a keyway 33a. The fork 35 is slidable along the shaft 33 and has disposed between its opposed fingers a spur gear 36 having a key entering the keyway 33a. Thus the fork 35 and the spur gear 36 are movable axially of the shaft 33 while the spur gear 36 is keyed to the shaft 33 and must turn therewith. Another spur gear 37 is mounted in the end of the fork 35 and meshes with the spur gear 36. The fork 35 has a handle 38 whereby it may be manipulated to move the fork axially of the shaft 33 and turn the fork to move the gear 37 selectively into mesh with the gears 29, 30, 31 and 32. Spring means (not shown) may be provided for urging the fork 35 with its handle 38 to turn in the counterclockwise direction viewing FIGURE 1 to maintain the gear 37 in mesh with a desired one of the gears 29, 30, 31 and 32. The gear 37 may also by appropriate means be held out of engagement with all of the gears 29, 30, 31 and 32.

The mounting structure 25 has mounted therein for rotation another vertical shaft 39 having a spur gear 40 fastened thereto at its upper end which meshes with the spur gear 34. A bevel gear 41 is fixed to the shaft 39 at its lower end. A horizontal shaft 42 is journaled in the mounting structure 25 and has fixed thereto a bevel gear 43 meshing with the bevel gear 41. The shaft 42 is connected by a coupling 44 with a shaft 45 journaled in the housing 1. A spur gear 46 is fixed to the shaft 45 and meshes with the originally mentioned gear 5 which is fixed to the shaft 4. Another shaft 48 is journaled in the housing 1 and has fixed thereto a spur gear 47 meshing with the spur gear 46 and has at its outer end a knob 48a for manual turning of the shaft 48. Turning of the gear train just described rotates the shaft 4 and through the meshing of the threads 6 with the threads in the opening 7 of the bracket 8 causes the housing 1 to move along the guide rods 2. The one-way clutch 23 limits such movement to a single direction. The multi-speed gear reducer provides for varying at will the speed of movement of the housing 1 along the guide rods 2.

A vertical shaft 49 is mounted in the housing 1, that shaft having a spur gear 50 fixed thereto at its lower extremity. The spur gear 50 meshes with a spur gear 51 fastened to the lower extremity of a vertical shaft 66 journaled in the housing 1. The spur gear 51 also meshes with the spur gear 20. The upper extremity of the shaft 49 is rounded at 49a and has opposed projections or ears 49b entering longitudinal slots 49c in the hollow lower portion 52 of a vertical shaft 52a carrying at its upper end the pinion P which moves the specimen mounting stage S in the direction of the double headed arrow X. The stage S is provided with a rack 70 with which the pinion P meshes. The upper end of the shaft 49 and the hollow lower portion 52 of the shaft 52a constitute a connectable and disconnectable coupling.

Two limit switches 53 and 54 are mounted on supports 55 and 56 respectively in the housing 1. The supports 55 and 56 are in turn adjustably mounted on rods 57 and 58. The shaft 58 has oppositely threaded portions 60 and 60a meshing with threads in enlarged end portions of the supports 55 and 56. Thus by turning the shaft 58 the distance between the supports 55 and 56 and hence the distance between the limit switches 53 and 54 may be adjusted. A spur gear 61 is fixed to the shaft 58 and engages a spur gear 62 mounted on a stub shaft 62a, which spur gear 62 meshes with a traverse length setting dial 63. Turning of the dial 63 determines the spacing between the limit switches 53 and 54.

A limit switch actuator 64 is mounted on a rack 65 parallel to the rack 70 which is guided by means not shown for movement in a direction parallel to its length. The shaft 66 has a pinion 67 meshing with the rack 65. The support 55 carries an indicator 68 cooperating with a scale 69 on the housing 1 indicating the length of traverse of the specimen mounting stage S which is proportional to the distance between the limit switches 53 and 54. An indicator board 71 (FIGURE 2) shows the speed and direction of movement of the stage S. A trace selector 72 controls the number of traces that the specimen will make beneath the microscope optical train.

The specimen T is fixed to the specimen mounting stage S and the distance between the limit switches 53 and 54 is adjusted to provide for the desired travel of the stage in the direction X. This is done by manipulation of the dial 63. The number of traverses to be made is determined by the setting of the trace selector 72. The desired angle of the return trace $T_2$ is determined by the setting of the multi-speed gear reducer as above described.

When the motor means 9 begins operation motion is imparted through the above described gearing to the vertical shafts 66 and 49. Turning of shaft 49 moves the stage S in the direction $T_1$ (FIGURE 3). Shaft 66 is turning at the same speed in the direction opposite the direction in which the shaft 49 is turning. As pinion 67 on shaft 66 engages rack 65 on the side opposite the side on which the pinion P engages the rack 70 both the rack 65 and the stage S move in the same direction at the same speed. Since one-way clutch 23 does not transmit motion when the motor means 9 is turning in the direction causing movement $T_1$ there is no movement of the housing 1 during such traverse. When the limit switch actuator 64 mounted on rack 65 touches a limit switch the servo-system 11 is reversed by reversing the motor 10a and the stage and actuator start back in the opposite direction. One-way clutch 23 then transmits movement through the gear train above described causing the housing 1 to move in the direction Y carrying the carrier C with it due to the passage of the shaft carrying the pinion P through the projecting portion or bracket C' of the carrier C as shown in FIGURE 1. The projecting portion or bracket C' of the carrier C has a portion C" through which the shaft 52a passes constituting in effect a bushing in which the shaft 52a rotates so that as the housing 1 is shifted along the rods 2 the stage moves in the direction of the arrow Y while it is moving in the direction of the double headed arrow X, the resultant movement being along a trace $T_2$. Thus the stage traverses a path as indicated in FIGURE 3.

The knob 48a provides for manual adjustment of the position of the housing in the direction Y and enables returning the housing to a desired starting point at the beginning of an operation. This is done while gear 37 is disengaged from the gears on shaft 28.

While I have shown and described a present preferred embodiment of the invention it is to be distinctly understood that the invention is not limited thereto but may be otherwise variously embodied within the scope of the following claims.

I claim:

1. Mechanism for automatically controllably moving the specimen mounting stage of a microscope comprising means connected with the stage acting on the stage to reciprocate it back and forth and simultaneously with and throughout such reciprocatory movement in one direction moving the stage transversely whereby the optical train of the microscope covers a predetermined field on the stage in automatically controlled manner; including a housing, means carried by the housing for reciprocating the stage back and forth and means for moving the housing transversely of the direction of back and forth reciprocation of the stage to corespondingly move the stage.

2. Mechanism as claimed in claim 1 in which the means carried by the housing for reciprocating the stage back and forth is a rotatable member mounted in the housing to turn about an axis which is fixed relatively to the housing and connected with the stage to move the stage in its reciprocating back and forth movement upon turning of the rotatable member, the stage being further connected with the rotatable member so that the stage is moved transversely of the direction of the reciprocating back and forth movement upon movement of the housing.

3. Mechanism as claimed in claim 1 including motor means carried by the housing and connections from the motor means to means carried by the housing for reciprocating the stage back and forth and connections from the motor means to the means for moving the housing transversely of the direction of back and forth movement of the stage.

4. Mechanism as claimed in claim 3 including means for periodically reversing the direction of operation of the motor means and means operated by the motor means in one direction of operation thereof only for moving the housing transversely of the direction of back and forth movement of the stage.

5. Mechanism for automatically controllably moving the specimen mounting stage of a microscope in which the stage is reciprocable in a carrier, comprising a housing which is mounted for bodily shifting movement, a rotatable member mounted in the housing to turn about an axis which is fixed relatively to the housing, the rotatable member being operatively connected with the stage to move the stage in reciprocatory back and forth movement upon turning of the rotatable member, the carrier having a portion engaging the rotatable member so that throughout the shifting of the housing in at least one direction the carrier and the specimen mounting stage carried thereby are moved transversely of the direction of the reciprocating back and forth movement of the stage.

6. Mechanism for automatically controllably moving the specimen mounting stage of a microscope in which the stage is reciprocable in a carrier and the stage has a toothed rack, comprising a housing which is mounted for bodily shifting movement, a rotatable member mounted in the housing to turn about an axis which is fixed relatively to the housing, the rotatable member having a toothed pinion meshing with the toothed rack of the stage whereby to move the stage in reciprocatory back and forth movement upon turning of the rotatable member, the carrier having a portion through which the rotatable member passes and constituting in effect a bushing in which the rotatable member rotates so that throughout the shifting of the housing in at least one direction the carrier and the specimen mounting stage carried thereby are moved transversely of the direction of the reciprocating back and forth movement of the stage.

7. Mechanism for automatically controllably moving the specimen mounting stage of a microscope comprising a stationary base, a housing mounted for movement relatively to the stationary base, means within the housing moving the housing reciprocably relatively to the stationary base and connections between such means and the specimen mounting stage moving the stage reciprocably in the same direction as the housing and simultaneously in a direction at generally right angles to the first direction throughout movement of the stage in the first direction.

8. Mechanism for automatically controllably moving the specimen mounting stage of a microscope comprising a stationary base, a housing mounted for movement relatively to the stationary base, means within the housing moving the housing relatively to the stationary base, motor means within the housing in driving relationship with such means and a driving connection between such means and the specimen mounting stage moving the stage reciprocably in the same direction as the housing and simultaneously in a direction at generally right angles to the first direction throughout movement of the stage in the first direction.

9. Mechanism for automatically controllably moving the specimen mounting stage of a microscope comprising a stationary base, a housing mounted for movement in a linear direction relatively to the stationary base, driving means with the housing for imparting said movement to the housing, gear means connecting the driving means to the microscope stage through the lateral movement spur gear of the stage, the lateral movement of the stage being at 90° to the movement of the housing, a pair of contact means adjustably spaced from each other in a line parallel to the lateral movement of the microscope stage, contact actuating means movable reciprocably between the contact means, gear means connecting the driving means and the contact actuating means, the respective gear means having a fixed drive ratio, means including electrical circuit means reversing the driving means when the contact actuating means touch a contact means and one-way clutch means causing movement of the housing only during lateral movement of the stage in one diretion.

10. Mechanism for automatically controllably moving the specimen mounting stage of a microscope comprising means connected with the stage acting on the stage to reciprocate it back and forth and simultaneously with such reciprocatory movement in one direction moving the stage transversely of the direction of back and forth reciprocation whereby the optical train of the microscope covers a predetermined field on the stage in automatically controlled manner, the mechanism including a housing, means carried by the housing for reciprocating the stage back and forth and means for moving the housing transversely of the direction of back and forth reciprocation of the stage to correspondingly move the stage, the means carried by the housing for reciprocating the stage back and forth being a rotatable member mounted in the housing to turn about an axis which is fixed relatively to the housing and connected with the stage to move the stage in its reciprocating back and forth movement upon turning of the rotatable member, the stage being further connected with the rotatable member so that the stage is moved transversely of the direction of the reciprocating back and forth movement upon movement of the housing.

11. Mechanism for automatically controllably moving the specimen mounting stage of a microscope comprising means connected with the stage acting on the stage to reciprocate it back and forth and simultaneously with such reciprocatory movement in one direction moving the stage transversely of the direction of back and forth reciprocation whereby the optical train of the micrscope covers a predetermined field on the stage in automatically controlled manner, the mechanism including a housing, means carried by the housing for reciprocating the stage back and forth and means for moving the housing transversely of the direction of back and forth reciprocation of the stage to correspondingly move the stage, the mechanism further including motor means carried by the housing and connections from the motor means to the means carried by the housing for reciprocating the stage back and forth and connections from the motor means to the means for moving the housing transversely of the direction of back and forth movement of the stage.

12. Mechanism for automatically controllably moving the specimen mounting stage of a microscope comprising means connected with the stage acting on the stage to reciprocate it back and forth and simultaneously with such reciprocatory movement in one direction moving the stage transversely of the direction of back and forth reciprocation whereby the optical train of the microscope covers a predetermined field on the stage in automatically controlled manner, the mechanism including a housing, means carried by the housing for reciprocating the stage back and forth and means for moving the housing transversely of the direction of back and forth reciprocation of the stage to correspondingly move the stage, the mechanism further including motor means carried by the housing and connections from the motor means to the means carried by the housing for reciprocating the stage back and forth and connections from the motor means to the means for moving the housing transversely of the direction of back and forth movement of the stage, together with means for periodically reversing the direction of operation of the motor means and means operated by the motor means in one direction of operation thereof only for moving the housing transversely of the direction of back and forth movement of the stage.

References Cited

UNITED STATES PATENTS

| 2,384,809 | 9/1945 | Bullard, et al. | 29—36 |
| 2,837,707 | 6/1958 | Stokes | 318—39 |
| 2,859,564 | 11/1958 | Farmer, et al. | 51—93 |
| 2,869,933 | 1/1959 | Bissinger | 308—5 |
| 2,942,385 | 6/1960 | Pal | 51—170 |
| 3,083,580 | 4/1963 | Carson, et al. | 74—113 |
| 3,155,383 | 11/1964 | Whitmore | 269—58 |

BOBBY R. GAY, *Primary Examiner.*

G. O. FINCH, *Assistant Examiner.*